(12) United States Patent
Graumann et al.

(10) Patent No.: US 8,005,976 B2
(45) Date of Patent: *Aug. 23, 2011

(54) ESTABLISHING OPTIMAL LATENCY IN STREAMING DATA APPLICATIONS THAT USE DATA PACKETS

(75) Inventors: David L. Graumann, Beaverton, OR (US); Claudia M. Henry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 12/489,321

(22) Filed: Jun. 22, 2009

(65) Prior Publication Data

US 2009/0262749 A1    Oct. 22, 2009

Related U.S. Application Data

(63) Continuation of application No. 10/734,324, filed on Dec. 12, 2003, now Pat. No. 7,552,229, which is a continuation of application No. 09/223,439, filed on Dec. 30, 1998, now Pat. No. 6,665,728.

(51) Int. Cl.
*G06F 15/16* (2006.01)
(52) U.S. Cl. ......... 709/232; 709/233; 709/234; 709/235
(58) Field of Classification Search ........... 709/232–235
See application file for complete search history.

(56) References Cited

U.S. PATENT DOCUMENTS

| | | | |
|---|---|---|---|
| 4,942,553 A | 7/1990 | Dalrymple et al. | |
| 4,945,548 A | 7/1990 | Iannarone et al. | |
| 5,038,209 A | 8/1991 | Hang | |
| 5,136,582 A | 8/1992 | Firoozmand | |
| 5,159,447 A | 10/1992 | Haskell et al. | |
| 5,285,442 A | 2/1994 | Iwamura et al. | |
| 5,365,552 A | 11/1994 | Astle | |
| 5,434,845 A | 7/1995 | Miller | |
| 5,434,872 A | 7/1995 | Petersen et al. | |
| 5,440,691 A | 8/1995 | Carrafiello et al. | |
| 5,465,348 A | 11/1995 | Amemiya et al. | |
| 5,534,937 A | 7/1996 | Zhu et al. | |
| 5,537,446 A | 7/1996 | Lakshman et al. | |

(Continued)

FOREIGN PATENT DOCUMENTS

JP    406152648    5/1994

OTHER PUBLICATIONS

Christopoulos, C., et al., "Hierarchical Segmentation Methods for Region-Based Video Coding", *IEEE*, (1998), 309-313.

(Continued)

*Primary Examiner* — Firmin Backer
*Assistant Examiner* — Brian P Whipple
(74) *Attorney, Agent, or Firm* — Schwegman, Lundberg & Woessner, P.A.

(57) ABSTRACT

Embodiments for an apparatus and method are provided that can build latency in streaming applications that use data packets. In an embodiment, a system has an under-run forecasting mechanism, a statistics monitoring mechanism, and a playback queuing mechanism. The under-run forecasting mechanism determines an estimate of when a supply of data packets to convert will be exhausted. The statistics monitoring mechanism measures the arrival fluctuations of the supply of data packets. The playback queuing mechanism can build the latency.

18 Claims, 8 Drawing Sheets

U.S. PATENT DOCUMENTS

| | | | |
|---|---|---|---|
| 5,543,853 A | 8/1996 | Haskell et al. | |
| 5,546,543 A | 8/1996 | Yang et al. | |
| 5,565,924 A | 10/1996 | Haskell et al. | |
| 5,602,537 A | 2/1997 | Dalrymple | |
| 5,619,341 A | 4/1997 | Auyeung et al. | |
| 5,664,044 A | 9/1997 | Ware | |
| 5,668,841 A | 9/1997 | Haskell et al. | |
| 5,703,877 A | 12/1997 | Nuber et al. | |
| 5,717,464 A | 2/1998 | Perkins et al. | |
| 5,732,094 A * | 3/1998 | Petersen et al. | 714/805 |
| 5,734,432 A | 3/1998 | Netravali et al. | |
| 5,754,241 A | 5/1998 | Okada et al. | |
| 5,778,175 A | 7/1998 | Paul et al. | |
| 5,784,572 A | 7/1998 | Rostoker et al. | |
| 5,793,937 A | 8/1998 | Chura et al. | |
| 5,812,526 A | 9/1998 | Chang et al. | |
| 5,835,691 A | 11/1998 | Matsunoshita | |
| 5,852,719 A | 12/1998 | Fishler et al. | |
| 5,859,980 A | 1/1999 | Kalkunte | |
| 5,949,792 A | 9/1999 | Yasuda et al. | |
| 5,978,356 A | 11/1999 | Elwalid et al. | |
| 6,061,404 A | 5/2000 | Yonemitsu et al. | |
| 6,075,768 A | 6/2000 | Mishra | |
| 6,075,770 A | 6/2000 | Chang et al. | |
| 6,085,221 A * | 7/2000 | Graf | 709/202 |
| 6,105,086 A | 8/2000 | Doolittle et al. | |
| 6,138,189 A | 10/2000 | Kalkunte | |
| 6,151,359 A | 11/2000 | Acer et al. | |
| 6,167,032 A | 12/2000 | Allison et al. | |
| 6,169,747 B1 | 1/2001 | Sartain | |
| 6,192,032 B1 | 2/2001 | Izquierdo | |
| 6,198,878 B1 | 3/2001 | Blawat et al. | |
| 6,205,525 B1 | 3/2001 | Korst | |
| 6,233,226 B1 | 5/2001 | Gringeri et al. | |
| 6,272,566 B1 | 8/2001 | Craft | |
| 6,301,258 B1 | 10/2001 | Katseff et al. | |
| 6,366,704 B1 | 4/2002 | Ribas-Corbera et al. | |
| 6,412,013 B1 | 6/2002 | Parthasarathy et al. | |
| 6,546,426 B1 | 4/2003 | Post | |
| 7,552,229 B2 | 6/2009 | Graumann et al. | |
| 2002/0016850 A1 * | 2/2002 | Fritz et al. | 709/232 |

OTHER PUBLICATIONS

Dionisio, J., et al., "A unified data model for representing multimedia, timeline, and simulation data", *IEEE Transactions on Knowledge and Data Engineering*, 10(5), (1998), 746-767.

Fujii, Tetsurou, et al., "A Load Balancing Technique for Video Signal Processing on a Multicomputer type DSP", *JCASSP-88*, (1988), 1981.

Som, S., et al., "Strategies for Predictability in Real-Time Data-Flow Architectures", *Department of Electrical and Computer Engineering,*, Old Dominion University, Norfolk, Virginia, (1990), 226.

Wang, B., et al., "Zero Waiting-Cycle Hierarchical Block Matching Algorithm and its Array Architectures", *IEEE Transactions on Circuits and Systems for Video Technology*, 4, (1994), 18.

Yang, Jie, et al., "Focus of Attention: Towards Low Bitrate Vidio Tele-Conferencing", *IEEE*, (1996), 97-100.

* cited by examiner

ESTABLISHING OPTIMAL LATENCY IN STREAMING DATA APPLICATIONS THAT USE DATA PACKETS

This application is a continuation of U.S. patent application Ser. No. 10/734,324, filed on Dec. 12, 2003 now U.S. Pat. No. 7,552,229, which is a continuation of U.S. patent application Ser. No. 09/223,439, filed Dec. 30, 1998 now U.S. Pat. No. 6,665,728, which applications are incorporated herein by reference in their entireties.

FIELD OF THE INVENTION

This invention relates generally to multimedia, and more particularly to data streaming applications that use data packets.

BACKGROUND OF THE INVENTION

In many network-based multimedia applications, data is sent from a first point to a second point in packets, which are then decoded when received at the second point, and played back on playback hardware. For example, in the case of streaming audio or video multicasting, a server sends to a number of clients over a network the packets of data that make up the desired audio or video, which are received at the clients, decoded, and played back. In another example, in a two- or multi-party video or audio conference, the parties send back and forth data packets over a network, which are then decoded at the receiving parties and played back. Such streaming applications are especially popular over the Internet, intranets, and extranets.

A difficulty with such applications, however, is that the transmittal and receipt of the data packets through the network may become hampered. Packets may be held up, or lost, for example, throughout the network. Or, the bandwidth at which a given party can receive or send packets may be limited. The practical effect of these problems is that the parties may find their audio and/or video streams broken up—that is, the resulting multimedia stream when played may be choppy, such that the perceptual quality of the playback may be degraded.

A limited solution to this problem is to introduce a predetermined latency in the data stream, via a buffer or other mechanism. In this way, if packets are held up in the network, playback at the receiving end is not affected because other packets still may be stored in the buffer. This solution has some success in one-way multicast situations, where a server is transmitting data for playback on multiple clients. This is because the clients only receive data packets, and are not expected to send responsive data packets to the server or the other clients.

However, in other situations, introduction of a predetermined latency is less than optimal. For example, in the case of audio or video conferences, where communication is two-way among the parties of the conference, introduction of a predetermined latency may affect the quality of the conference, especially where the latency is larger than required. The parties may find, for example, that their ability to respond in a timely manner to parties is affected. That is, because the parties may assume that the conference is occurring in real-time, when in reality the conference is being buffered, it may be difficult for parties to interrupt another in a manner that resembles a normal, in-person conference.

For these and other reasons, there is a need for the present invention.

DETAILED DESCRIPTION

Figure 1A:
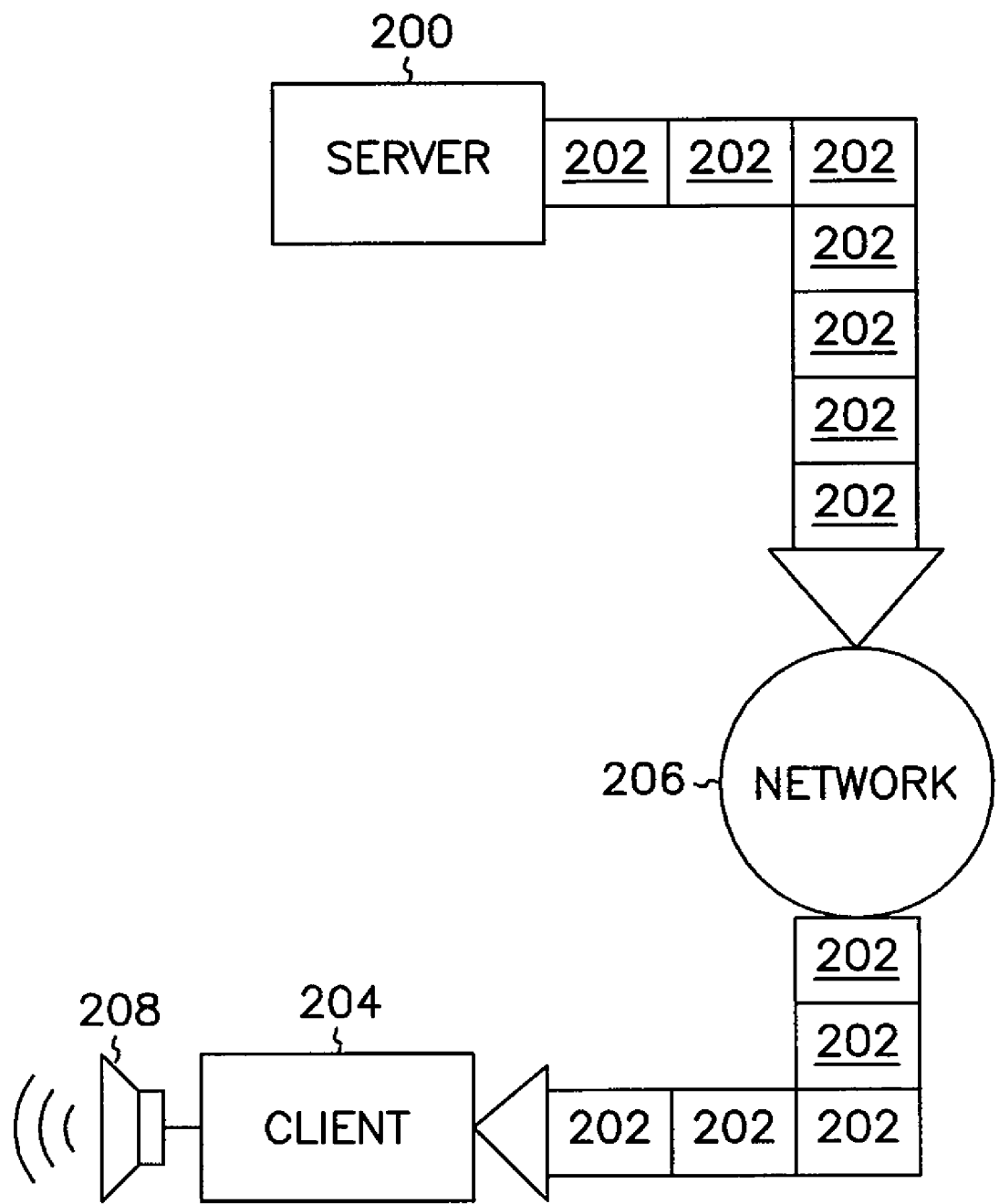
FIG. 1(a) and FIG. 1(b) show block diagrams of systems in accordance with which embodiments of the invention may be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments provide for latency in streaming applications that use data packets. In one embodiment, a system includes an under-run forecasting mechanism, a statistics monitoring mechanism, and a playback queuing mechanism. The under-run forecasting mechanism determines an estimate of when a supply of data packets will be exhausted. The statistics monitoring mechanism measures the arrival time characteristics of the supply of data packets. The playback queuing mechanism builds latency in the supply of data packets based upon input from the under-run forecasting mechanism and arrival fluctuations measured by the statistics monitoring mechanism. In one embodiment, the supply of data packets relates to audio.

Referring first to FIG. 1(a), a diagram of a system in conjunction with which embodiments of the invention may be practiced is shown. The server 200 sends a plurality of packets 202 to the client 204, via the network 206. Each of the server 200 and the client 204 may be a computer in one embodiment, although the invention is not so limited. The network may be the Internet, an intranet, an extranet, etc.; the invention is not so limited. Each of the packets 202 includes data representing a part of a multimedia stream, such as an audio or video stream. The client 204 receives these packets, in one embodiment converts the data (e.g., to an analog format, such as audio or video—although conversion to analog is not required, as will be described in conjunction with FIG. 1(b)) and, in the embodiment of FIG. 1(a), plays back the resulting data as converted on a device 208. The device 208 as shown in FIG. 1(a) is a speaker, to playback audio, although the invention is not so limited.

Figure 1B:
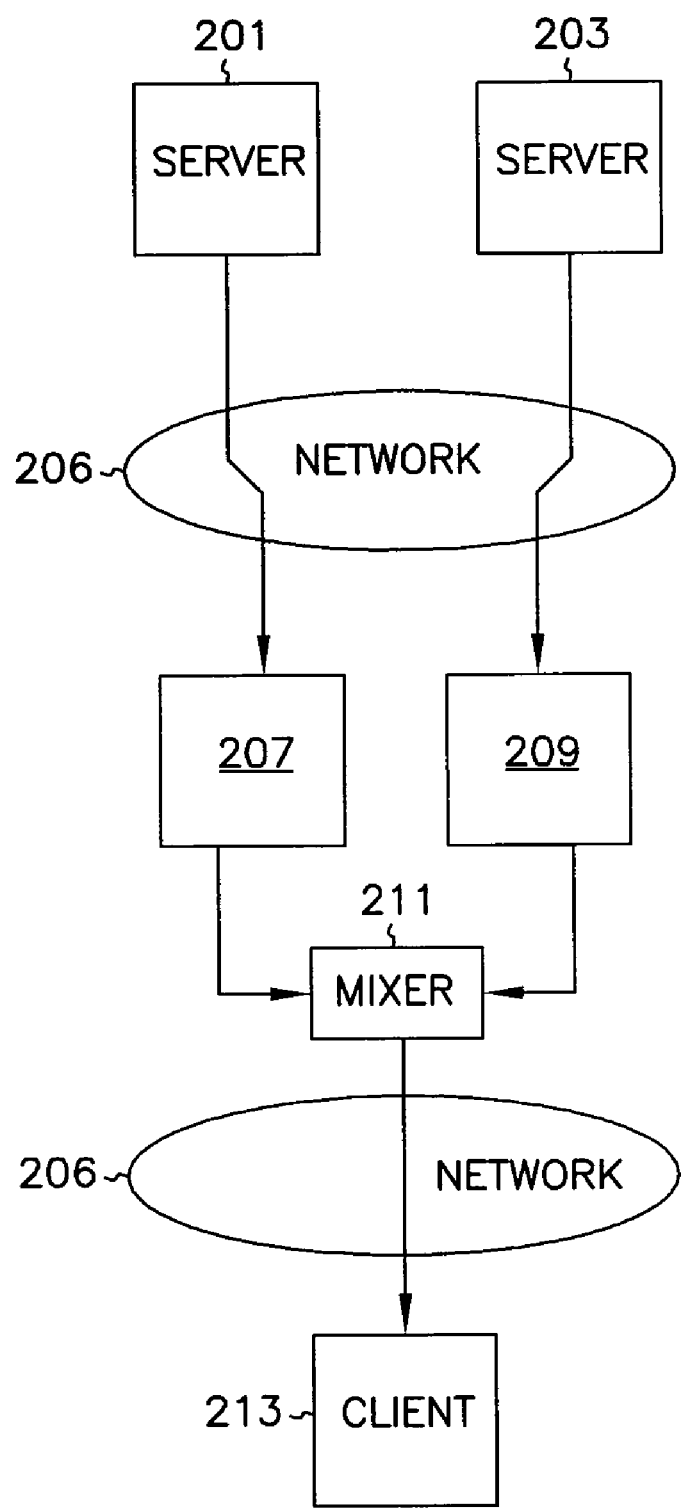

In theory, the client 204 receives packets from the server 200 on a just-in-time basis, such that while potentially converting the data (e.g., to analog) and playing back a first packet, a second packet is being received, which is then ready for converting and playback just as the first packet is finished being processed. Thus, the client 204 does not need to build up latency in the supply of packets it receives—that is, it does not have to store or buffer any extra packets to provide for the situation where a packet is not received as it is expected by the client 204. However, in reality, packets may be lost or delayed in being transported through the network 206 from the server 200 to the client 204. Thus, in general, a latency of packets may be necessary to be built up in the client 204, to allow for these situations; however, desirably, the latency built up is the minimal latency required. (Another embodiment of the invention is shown in FIG. 1(b), in which conversion (e.g., to analog) is not required—rather, the servers 201 and 203 send data through the network 206, and latency is built up at the components 207 and 209, mixed at the mixer 211, and sent again through the network 206 for the playback at the client 213. In one embodiment, it is noted that components 207 and 209, and mixer 211, can be either hardware or software, such that they are within a single computer, although the invention is not necessarily so limited.)

Figure 2:
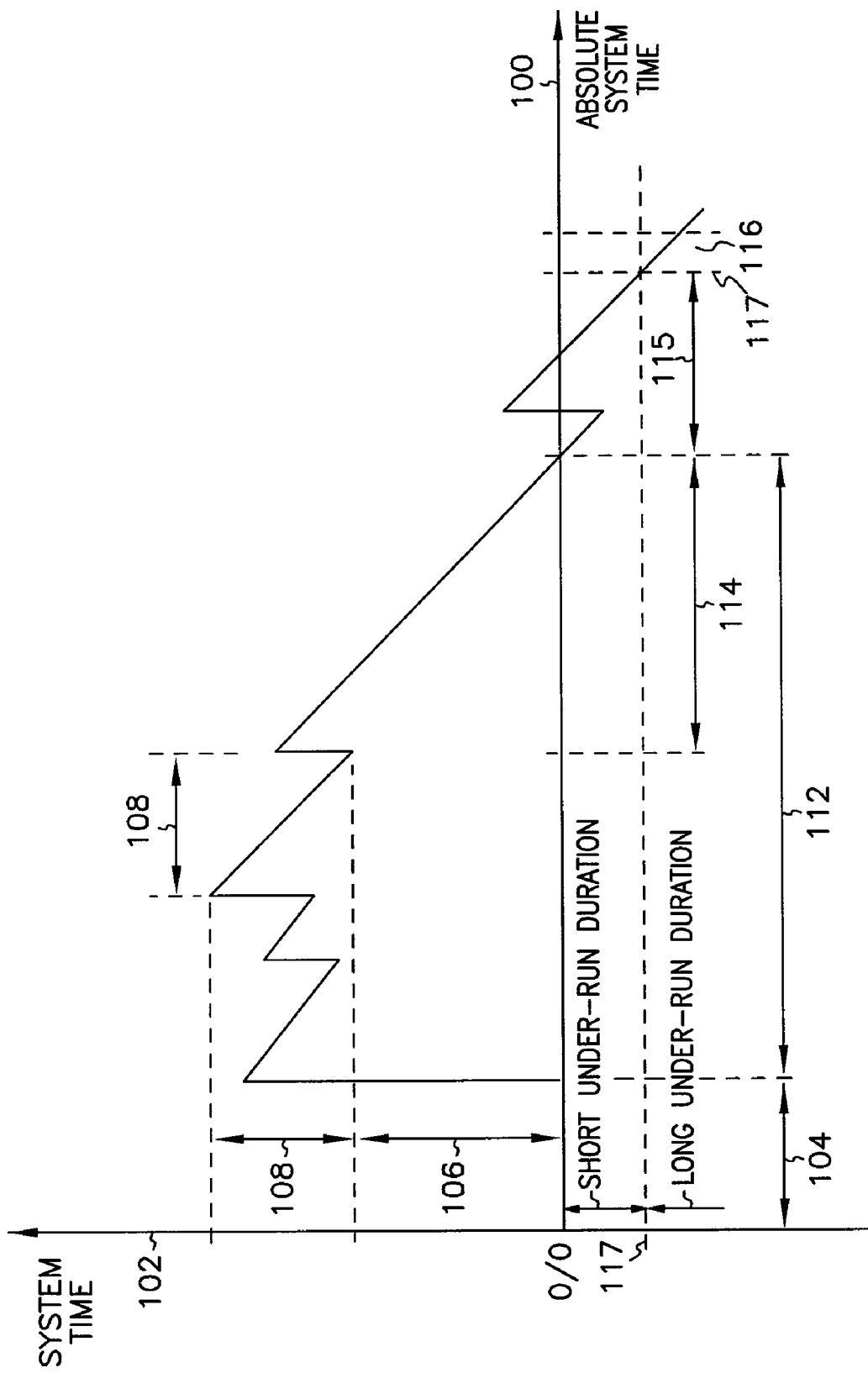
FIG. 2 shows a diagram of an audio data packet delivery sequence in accordance with which embodiments of the invention may be implemented.

Referring next to FIG. 2, a diagram is shown illustrating packet delivery at a client computer, in accordance with which embodiments of the invention may be applied. The X axis 100 represents absolute system time; the Y axis 102 represents the amount of latency at the client computer. That is, the Y axis 102 represents the amount of time the client computer has before it runs out of packets, and, at least in some embodiments, playback data. Time section 104 represents an initial build up of packets, such that an excess latency 106 is obtained. Ideally, there is minimal latency 106; thus, embodiments of the invention attempt to minimize the amount of the excess latency 106.

The time segment 108 measures the ideal amount of latency. The time segment 108 is the amount of time required to receive a new packet, which includes: waiting for a packet from 206, processing its contents, and concatenating it with previous playback packets. Thus, having an amount of latency equal to the time segment 108 corresponds to latency such that while a first packet is potentially being converted (e.g., to analog) and played back (at least in some embodiments), a second packet is being received, and will itself be ready for potential conversion to analog and playback when the first packet has finished being processed. This is an ideal amount of latency. A negative latency indicates that an under-run situation exists, where there is a length of time where the client computer is ready to process another packet, but is still waiting to receive another packet for processing, such that the playback at the client is interrupted at least momentarily.

The start of playback 110 shows a burst of latency after an initial build-up 104 of excess latency, and the time segment 112 shows stable audio delivery. Therefore, to achieve ideal latency, the time segment 112 should be translated downwards along the Y axis 102, such that the X axis 100 is touched, but never crossed over. This corresponds to an absolute minimal amount of latency (that is, a total excess latency equal to the time segment 108).

The time segment 114 shows a situation in which there is a delay in packets reaching the client computer, such that the excess latency is being reduced. The time segments 115 and 116 show a situation where the excess latency is completely exhausted. The playback is interrupted momentarily, because there are not sufficient packets at the client computer to maintain steady and consistent playback. In the time segment 115, the period of time, or under-run duration, during which there are no packets to play is short. In the time segment 116, the under-run duration is long, by comparison. The amount of time at which a short under-run duration becomes a long under-run duration is referred to as the short under-run time limit, indicated by 117 in the figure.

Thus, at least some embodiments of the invention attempt to provide for a minimal excess latency. Ideally, this minimal excess latency is the absolute minimal amount of latency, as has been described. However, because variations in packet delivery may occur, occasionally minimal excess latency may be greater than the absolute minimal amount of latency possible. An example of such variations is shown in FIG. 2 as time segment 114, where there is a delay in packets reaching the client computer.

Figure 3:
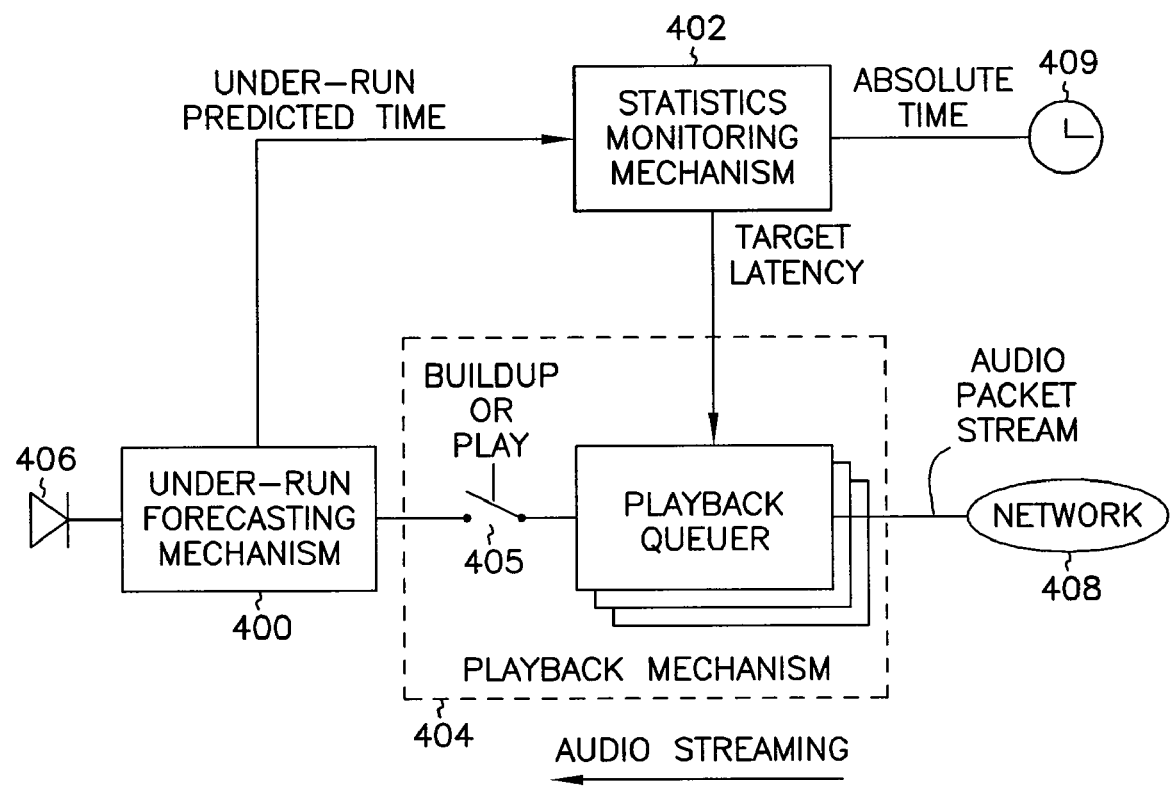
FIG. 3 shows a block diagram of a system according to one embodiment of the invention.

Referring to FIG. 3, a diagram of a system in accordance with one embodiment of the invention is shown. The system of FIG. 3 attempts to provide minimal excess latency, as has been already described in conjunction with FIG. 1(a), FIG. 1(b), and FIG. 2. The system of FIG. 3 can in one embodiment be implemented within a client computer receiving packets over a network from a server computer, although the invention is not so limited. The system of FIG. 3 can also be implemented in software or hardware; again, the invention is not so limited. The system of FIG. 3 includes an under-run forecasting mechanism 400, a statistics monitoring mechanism 402 coupled to the under-run forecasting mechanism 400, and a playback queuing mechanism 404 coupled to both the mechanism 400 and the mechanism 402. A playback device 406 is also coupled to the mechanism 400, and the playback queuing mechanism 404 is coupled to a network 408. The playback device 406 may relate to any type of data within the data packets, such as including a speaker in the case of audio data.

The flow of data packets through the system of FIG. 3 is as follows. Data packets are first processed by the playback queuing mechanism 404 upon being received from the network 408, the latency built up by the mechanism 404 determined based on information received from the under-run forecasting mechanism 400 and the statistics monitoring mechanism 402. The data packets then are processed through the under-run forecasting mechanism 400, and pass through to the playback device 406, where in the embodiment of the invention shown in FIG. 3 the packets are converted (e.g., to analog), and, at least in some embodiments, played back. Information assessed by the under-run forecasting mechanism 400 is provided to the statistics monitoring mechanism 402, as well.

Each of the mechanisms 400, 402 and 404 are now described in more detail. The under-run forecasting mechanism 400 determines an estimate of when a supply of data packets will be exhausted. That is, the mechanism 400 estimates when the playback device 406 will run out of data packets. The mechanism 400 calculates the amount of data that is being submitted to the playback device 406 (that is, the duration of time it will take the device 406 to playback the data in the current packet, once converted (e.g., to analog), and assuming that conversion takes minimal time to accomplish as compared to the time taken to playback the data), and adds this to a running under-run prediction time. To keep track of absolute time, the under-run forecasting mechanism 400 uses a free-running (absolute) system clock 409.

The statistics monitoring mechanism 402 measures arrival fluctuations of the supply of data packets received by the system. That is, the mechanism 402 measures the degree of fluctuation of the packet delivery to the playback device 406. Thus, the mechanism 402 monitors the arrival time characteristics of the supply of data packets, and the characteristic (that is, the behavior) of the previously predicted under-run times by the mechanism 400. The variations measured may be due to delays in delivery to the system of packets of data through the network 408, for example; such variations are resultant of what is termed transport load. Other variations may be due to delays inherent in the system itself, for example; these variations are resultant of what is termed CPU load. The difference between the under-run predicted time and the absolute system time fluctuates proportionally to fluctuations in the transport and operating system loads. This difference has been found to be a reliable indicator of the playback stability of the system, where such stability refers to the ability of the playback device 406 to have a steady stream of data packets for conversion and playback, without interruption.

The playback queuing mechanism 404 is capable of building latency in the supply of data packets, based on the estimate determined by the under-run forecasting mechanism 400, and the arrival fluctuations measured by the statistics monitoring mechanism 402. The statistics monitoring mechanism tallies the packet arrival time characteristics that result from fluctuations in the entire packet delivery system. On a regular basis, the difference between the under-run predicted time and the absolute time is calculated. In one embodiment, this time difference is histogrammed with a 10 millisecond resolution in a range of 0 to 1 second, although the invention is not so limited. The time differences are exponentially weighted before being histogrammed, so that more recently computed time differences may be weighted more heavily in the histogram than time differences computed earlier. The shape of the histogram is then interpreted to determine the optimal minimal latency, or target latency, that is likely to avoid under-runs in the stream. In one embodiment, the minimum latency is set to twice the standard deviation of the time differences. The minimum latency is capped to a predetermined limit if this calculation exceeds a maximum tolerable latency buildup. The invention, however, is not so limited to this manner by which minimum latency is determined.

The mechanism 404 in one embodiment can operate in accordance with two modes. As shown in the detailed view of the mechanism 404, the mechanism 404 includes a switch 405 that is open in latency-building mode, and, in streaming mode, is closed. The method of FIG. 6, as will be described, determines whether the switch is open or closed, such that the appropriate delay is introduced into the stream.

In latency-building mode, the mechanism 404 buffers data packets as determined based on the estimate provided by the under-run forecasting mechanism 400, and the arrival fluctuations measured by the statistics monitoring mechanism 402. In streaming mode, the data packets are not buffered. The operation of the mechanism 404 in one or the other mode is also determined by the information received by the mechanism 400 and 402.

The operation of the system of FIG. 3 is now described. The system includes basic decision-based logic, which is used to maintain the best streaming possible while incurring a minimal amount of latency. The decision logic uses the difference between the under-run forecasting mechanism's most recent under-run predicted time and the current absolute system time. If, based on this time difference, the decision logic determines that an under-run of long duration has occurred, then data is built up in the queue and the under-run forecasting mechanism and statistics monitoring mechanism do not update their parameters. The amount of data to be built up in the queue is the optimal minimum latency, or target latency, already described. This mode of operation is referred to as latency-building mode. After this latency is established, all data is immediately passed to the playback device, and the under-run forecasting mechanism is allowed to updates its parameters. If the decision logic determines that there is no under-run at present or if the under-run is of short duration, then all data is passed down to the target hardware and the under-run forecasting mechanism and statistics monitoring mechanism update their parameters. This mode of operation is referred to as streaming mode. Latency-building mode and streaming mode are discussed further in FIG. 4.

As a precautionary measure, in one embodiment, there are a few subtleties to this control logic that further enhance data packet flow. If it is determined that too much data needs to be queued to maintain a stable stream, then the network is too unstable for queuing, and no queuing is imposed. As a second precautionary measure, the latency-building process periodically flushes stale data caught in the queuing process. Data in the queue becomes stale if the queue partially fills, but then no more data is received to finish filling the queue before a timeout occurs.

Figure 4:
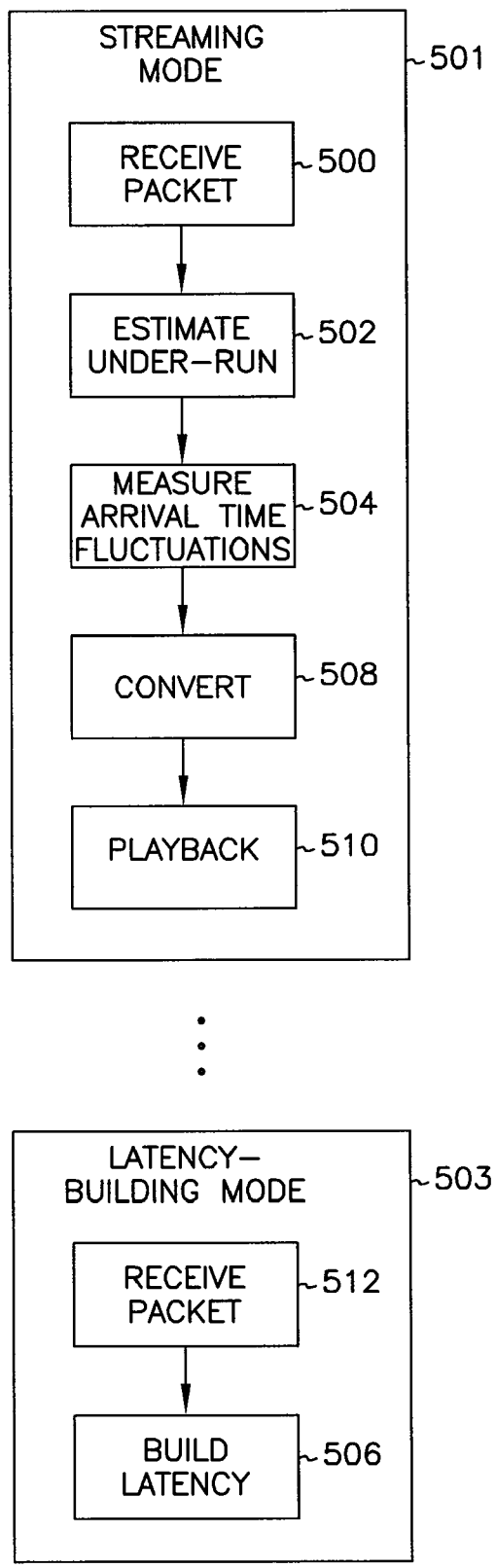
FIG. 4 shows a flowchart of a method according to an embodiment of the invention.

Referring to FIG. 4, a method in accordance with an embodiment of the invention is shown. The method may be implemented in accordance with the systems of FIG. 1(*a*), FIG. 1(*b*), and FIG. 3 that have been described. The method is desirably realized at least in part as one or more programs running on a computer—that is, as a program executed from a computer-readable medium such as a memory by a processor of a computer. The programs are desirably storable on a computer (or machine)-readable medium such as a floppy disk or a CD-ROM, for distribution and installation and execution on another computer. Each program desirably includes machine-executable instructions, as known within the art.

The method is divided into two sections, a streaming mode 501, and a latency-building mode 503. In the streaming mode, in 500, a data packet of a supply of data packets is received. In 502, an estimate of when the supply of data packets to convert will be exhausted is determined, for example, as has been described in conjunction with the under-run forecasting mechanism of FIG. 3. In 504, the arrival fluctuations of the supply of data packets are measured, for example, as has been described in conjunction with the statistics monitoring mechanism of FIG. 3. In 508, a data packet is converted (e.g., to analog), and then played back in 510. In the latency-building mode, in 512, a data packet is received, and, in 506, latency is built into the supply of data packets. This target latency is based on the estimate determined in 502 and the arrival fluctuations measured in 504, for example, as has been described in conjunction with the playback queuing mechanism of FIG. 3.

The transition from streaming mode to latency-building mode occurs only after a long under-run has taken place. If the under-run predicted time is just a little bit behind the current time, then this is considered to be a short under-run. When a short under-run occurs, the method has miscalculated the queuing needed to maintain a stable stream of data packets. During such under-runs, on the order of 500 milliseconds or less in one embodiment, the decision logic remains in streaming mode. Packets continue to be passed to the playback mechanism, the statistics monitoring mechanism continues to calculate arrival time statistics, and the under-run forecasting mechanism updates its parameters. However, once the under-run duration exceeds the short under-run time limit, latency-building mode is entered. Streaming mode is not entered again until after sufficient latency has been built up in the queue, according to the target latency previously described.

Figure 5:
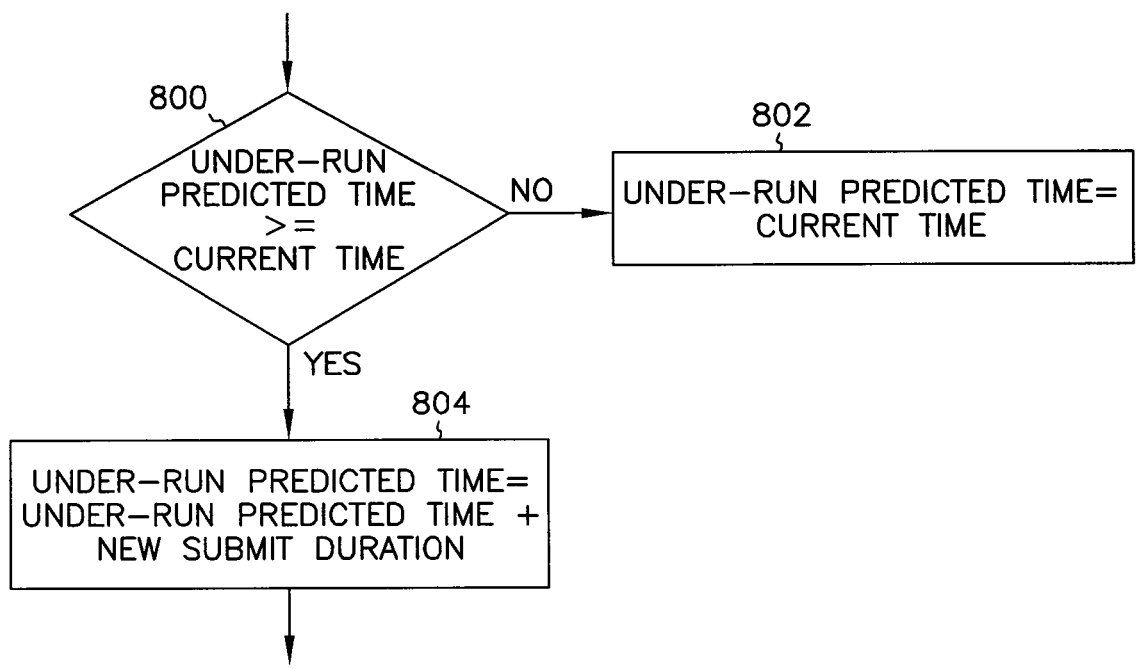
FIG. 5 shows a flowchart of an under-run forecast method in accordance with an embodiment of the invention.

Referring to FIG. 5, a flowchart of an under-run forecast method in accordance with an embodiment of the invention is shown. The under-run forecast method of FIG. 5 is in one embodiment performed by an under-run forecasting mechanism, such as the under-run forecasting mechanism of FIG. 3. In 800, it is determined whether the under-run predicted time is greater than or equal to the current system time. If not, then the under-run predicted time is set to the current system time in 802. From 802, or where the under-run predicted time has been determined to be greater than or equal to the current system time in 800, the method proceeds to 804. In 804, a new under-run predicted time is determined, as equal to the prior under-run predicted time plus the length of time of the current data packet (that is, the duration of time it will take a playback device to play the data in the packet, after conversion to analog).

Figure 6:
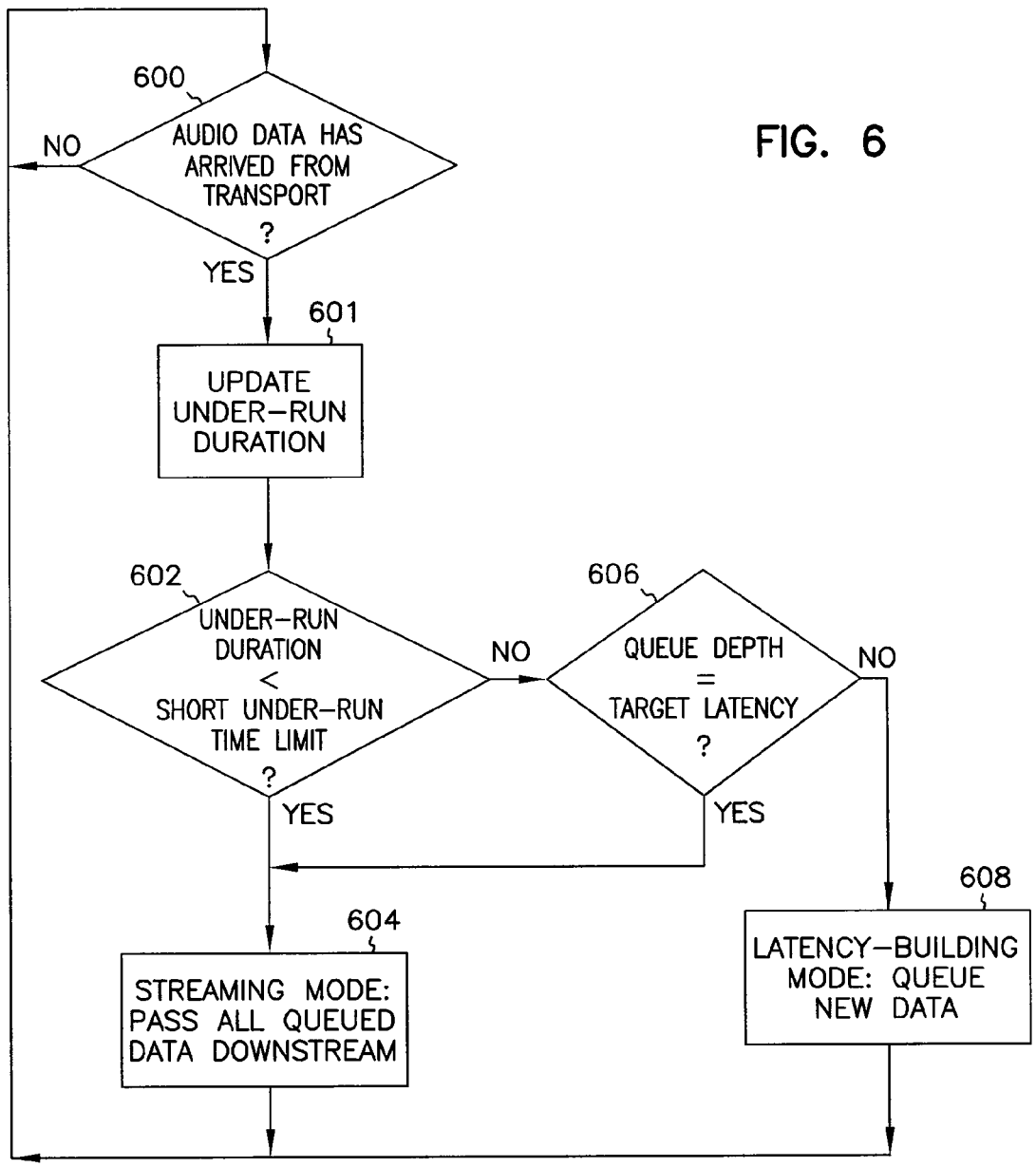
FIG. 6 shows a flowchart of a playback queuing control method in accordance with an embodiment of the invention; and, FIG. 7 shows a diagram of a computer in conjunction with which embodiments of the invention may be practiced.

Referring now to FIG. 6, a flowchart of a playback queuing control method according to an embodiment of the invention is shown. This method determines whether a data packet is to be passed through in streaming mode, or buffered in latency-building mode, according to an embodiment of the invention. In one embodiment, the method is performed by a playback queuing mechanism, such as the playback queuing mechanism of FIG. 3, as has been described.

In 600, it is determined whether a new data packet has arrived from a network (i.e., a transport). Once a new packet has arrived, then in 601, the under-run duration is updated, and in 602, it is determined whether the current under-run duration is less than the short under-run time limit, as determined by an under-run forecasting mechanism, such as the under-run forecasting mechanism of FIG. 3, as has been described. If yes, then in 604, data previously queued (or, if none, the data received in 600) is passed downstream to a playback device, and the method repeats at 600. 604 is the streaming mode as previously described.

If no, then in 606 it is determined whether sufficient latency has been built, according to an optimal target latency already determined (and not determined in the method of FIG. 6). If there is sufficient latency, then queued data is again passed downstream to a playback device, and the method repeats at 600. If there is insufficient latency, then in 608 the new data packet received is queued, and the method repeats at 600. 608 is the latency-building mode as previously described.

Figure 7:
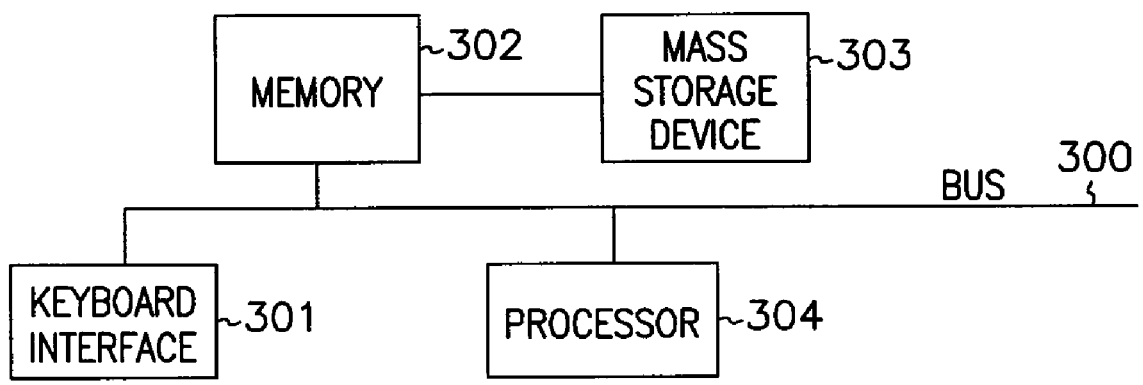

Referring finally to FIG. 7, a diagram of a computer in conjunction with which embodiments of the invention may be practiced is shown. The computer comprises bus 300, keyboard interface 301, external memory 302, mass storage device 303 and processor 304. Bus 300 can be a single bus or a combination of multiple buses. Bus 300 can also comprise combinations of any buses. Bus 300 provides communication links between components in the computer. Keyboard controller 301 can be a dedicated device or can reside in another device such as a bus controller or other controller. Keyboard controller 301 allows coupling of a keyboard to the computer system and transmits signals from a keyboard to the computer system. External memory 302 can comprise a dynamic random access memory (DRAM) device, a static random access memory (SRAM) device, or other memory devices. External memory 302 stores information from mass storage device 303 and processor 304 for use by processor 304. Mass storage device 303 can be a hard disk drive, a floppy disk drive, a CD-ROM device, or a flash memory device. Mass storage device 303 provides information to external memory 302. Processor 304 can be a microprocessor and may be capable of decoding and executing a computer program such as an application program or operating system.

Building optimal (minimal) latency in streaming data packets has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:
1. A method comprising:
    receiving a packet from a network, the packet being a packet of a video, an audio, or a multimedia stream;
    updating an under-run duration corresponding to the stream;
    determining whether the updated under-run duration is less than a short under-run time limit set by an under-run forecasting mechanism;
    passing data in a queue or, if the queue has no data, the received packet to a playback device, upon the determination that the updated under-run duration is less than the short under-run time limit;
    determining whether sufficient latency has been built, upon the determination that the updated under-run duration is not less than the short under-run time limit;
    passing the data in the queue or, if none, the received packet to the playback device upon the determination that sufficient latency has been built; and
    queueing the received packet upon the determination that insufficient latency has been built.
2. The method of claim 1, wherein determining whether sufficient latency has been built includes determining if a depth of the queue equals a target latency.
3. The method of claim 2, wherein the method includes generating the target latency before receiving the data.

4. The method of claim 1, wherein determining whether sufficient latency has been built includes determining if depth of the queue equals a target latency determined in a statistics monitoring mechanism.

5. A machine-readable storage device having instructions stored thereon for execution by a processor to perform operations that comprises:
receiving a packet from a network, the packet being a packet of a video, an audio, or a multimedia stream;
updating an under-run duration corresponding to the stream;
determining whether the updated under-run duration is less than a short under-run time limit set by an under-run forecasting mechanism;
passing data in a queue or, if the queue has no data, the received packet to a playback device, upon the determination that the updated under-run duration is less than the short under-run time limit;
determining whether sufficient latency has been built, upon the determination that the updated under-run duration is not less than the short under-run time limit;
passing the data in the queue or, if none, the received packet to the playback device upon the determination that sufficient latency has been built; and
queueing the received packet upon the determination that insufficient latency has been built.

6. The machine-readable device of claim 5, wherein determining whether sufficient latency has been built includes determining if depth of the queue equals a target latency.

7. The machine-readable device of claim 6, wherein the method includes generating the target latency before receiving the data.

8. The machine-readable device of claim 5, wherein determining whether sufficient latency has been built includes determining if depth of the queue equals a target latency determined in a statistics monitoring mechanism.

9. A system comprising:
an under-run forecasting mechanism to determine an estimate of when a supply of data packets will be exhausted and to set a short under-run time limit;
a statistics monitoring mechanism configured to measure arrival fluctuations of the supply of data packets and to determine a target latency;
a playback queuing mechanism to operatively determine whether to pass a data packet received from a network in a streaming mode or buffered in a latency-building mode, wherein the playback queuing mechanism is arranged to build latency in the supply of data packets based on the estimate determined by the under-run forecasting mechanism and the arrival fluctuations measured by the statistics monitoring mechanism; and
a processor to control one or more of the playback queuing mechanism, the under-run forecasting mechanism, or the statistics monitoring mechanism.

10. The system of claim 9, wherein the system is adapted to send data packets from the playback queuing mechanism to a playback device.

11. The system of claim 10, wherein the playback device is a multi-media device.

12. The system of claim 9, wherein the system includes decision-based logic to determine the target latency based on a time difference between an updated under-run predicted time and an absolute system time.

13. The system of claim 9, wherein the system further includes:
a bus;
a machine-readable storage medium coupled to the processor by the bus, the machine-readable storage medium having instructions stored thereon for execution by the processor to perform operations that includes:
receiving the data packet from the network, the packet being a packet of a video, an audio, or a multimedia stream;
updating an under-run duration corresponding to the stream;
determining whether the updated under-run duration is less than the short under-run time limit;
passing data in a queue or, if the queue has no data, the received data packet to a playback device, upon the determination that the updated under-run duration is less than the short under-run time limit;
determining whether sufficient latency has been built, upon the determination that the updated under-run duration is not less than the short under-run time limit;
passing the data in the queue or, if none, the received packet to the playback device upon the determination that sufficient latency has been built; and
queueing the received data packet upon the determination that insufficient latency has been built.; and
a connection to receive the received data packets from the network.

14. The system of claim 9, wherein the system is operable to build latency in the supply of received data packets if the supply of received data packets is less than a target latency.

15. The system of claim 9, wherein the system is operable to impose no queuing if it is determined that building latency in the supply of received data packets requires queuing data at a level more than a threshold amount to maintain a stable stream of data.

16. The system of claim 9, wherein the system is operable to generate the target latency as twice a standard deviation of time differences between a running under-run predicted time and an absolute system time.

17. The system of claim 9, wherein the system is operable to update an under-run predicted time based on a comparison of the under-run predicted time with a current time by adding an amount time for playing back a supply of data packets to the under-run predicted time, if the under-run predicted time is greater than or equal to the current time.

18. The system of claim 9, wherein the statistics monitoring mechanism to measure arrival fluctuations of the supply of data packets includes the statistics monitoring mechanism arranged to monitor a distribution of an arrival of the supply of data packets and to monitor a characteristic of previously predicted under-run times.

* * * * *

UNITED STATES PATENT AND TRADEMARK OFFICE
CERTIFICATE OF CORRECTION

PATENT NO. : 8,005,976 B2  Page 1 of 1
APPLICATION NO. : 12/489321
DATED : August 23, 2011
INVENTOR(S) : David L. Graumann et al.

It is certified that error appears in the above-identified patent and that said Letters Patent is hereby corrected as shown below:

In column 10, line 30, in Claim 13, delete "built.;" and insert -- built; --, therefor.

Signed and Sealed this
Eighteenth Day of October, 2011

David J. Kappos
*Director of the United States Patent and Trademark Office*